United States Patent
Ohkubo et al.

(10) Patent No.: US 10,445,752 B2
(45) Date of Patent: Oct. 15, 2019

(54) BEHAVIOR ANALYSIS DEVICE

(71) Applicant: Hitachi, Ltd., Chiyoda-ku, Tokyo (JP)

(72) Inventors: Norio Ohkubo, Tokyo (JP); Miki Hayakawa, Tokyo (JP); Norihiko Moriwaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 756 days.

(21) Appl. No.: 14/895,733

(22) PCT Filed: Jun. 21, 2013

(86) PCT No.: PCT/JP2013/067029
§ 371 (c)(1),
(2) Date: Dec. 3, 2015

(87) PCT Pub. No.: WO2014/203386
PCT Pub. Date: Dec. 24, 2014

(65) Prior Publication Data
US 2016/0125430 A1    May 5, 2016

(51) Int. Cl.
*G06Q 30/02* (2012.01)
*H04W 4/021* (2018.01)
*H04W 4/029* (2018.01)

(52) U.S. Cl.
CPC ......... *G06Q 30/0201* (2013.01); *G06Q 30/02* (2013.01); *H04W 4/021* (2013.01); *H04W 4/029* (2018.02)

(58) Field of Classification Search
CPC ... G06Q 30/02; G06Q 30/0201; H04W 4/021; H04W 4/029

USPC ....................................................... 705/7.27
See application file for complete search history.

(56) References Cited

U.S. PATENT DOCUMENTS

| 5,027,314 A | * | 6/1991 | Linwood | ............... G06K 7/1097 340/573.4 |
| 5,287,266 A | * | 2/1994 | Malec | ................... B62B 3/1408 705/323 |
| 5,572,653 A | * | 11/1996 | DeTemple | ......... G06K 17/0022 235/383 |

(Continued)

FOREIGN PATENT DOCUMENTS

| JP | 11-64505 A | 3/1999 |
| JP | 2004-302781 A | 10/2004 |

(Continued)

OTHER PUBLICATIONS

J.A. Fisher, T. Monahan, "Evaluation of real-time location systems in their hospital contexts," Int. J. Med. Inform., 81 (2012), pp. 705-712, http://dx.doi.org/10.1016/j.ijmedinf.2012.07.001 (Year: 2012).*

(Continued)

*Primary Examiner* — Jonathan G Sterrett
*Assistant Examiner* — George H Walker, III
(74) *Attorney, Agent, or Firm* — Crowell & Moring LLP

(57) ABSTRACT

In order to solve the problem of an increase in the number of electronic devices that transmit specific signals and are installed inside a store in order to obtain traffic line information, the present invention calculates position coordinates in a facility using a calculation formula based on the number of signals received and the pattern of the number of signals received, and determines traffic line information.

7 Claims, 12 Drawing Sheets

(56) References Cited

U.S. PATENT DOCUMENTS

| | | | | |
|---|---|---|---|---|
| 5,984,175 A * | 11/1999 | Popp | G07C 9/00111 | 235/375 |
| 6,175,308 B1 * | 1/2001 | Tallman | B60R 25/102 | 340/426.2 |
| 7,188,045 B1 * | 3/2007 | Cirielli | G06F 3/011 | 345/166 |
| 2004/0111454 A1 * | 6/2004 | Sorensen | G06Q 30/02 | 708/200 |
| 2006/0059049 A1 * | 3/2006 | Morris | G06Q 30/02 | 705/26.1 |
| 2008/0000968 A1 * | 1/2008 | Cato | G01S 7/006 | 235/385 |
| 2008/0294487 A1 * | 11/2008 | Nasser | G06Q 30/02 | 705/7.32 |
| 2009/0326807 A1 * | 12/2009 | Ramaswamy | H04L 67/12 | 701/408 |
| 2010/0250305 A1 * | 9/2010 | Lee | G06Q 10/06316 | 705/7.26 |
| 2012/0019393 A1 * | 1/2012 | Wolinsky | G06Q 30/02 | 340/686.1 |
| 2013/0054310 A1 * | 2/2013 | Sickenius | G06Q 30/02 | 705/7.39 |
| 2014/0188591 A1 * | 7/2014 | Argue | G06Q 30/0267 | 705/14.38 |

FOREIGN PATENT DOCUMENTS

| | | |
|---|---|---|
| JP | 2012-194023 A | 10/2012 |
| WO | WO 2007/110964 A1 | 10/2007 |

OTHER PUBLICATIONS

International Search Report (PCT/ISA/210) issued in PCT Application No. PCT/JP2013/067029 dated Aug. 27, 2013, with English translation (three (3) pages).

* cited by examiner

INFRARED TRANSMITTER

BEHAVIOR ANALYSIS DEVICE

BACKGROUND

The present invention relates to a behavior analysis device for customers or employees in a store and so on.

It is important to grasp behavior of customers or employees in a store in order to consider actions for increasing the sales of the store.

A technique to measure traffic lines of customers in a store is proposed, which disposes electronic devices transmitting intermittent unique signals in the store, attaches receivers to shopping bags carried by the customers, and outputs the movement paths as the traffic line information.

PRIOR ART

Patent Literature 1: JPH11-64505 A

SUMMARY

Conventional techniques such as Patent Literature 1 require a large number of electronic devices transmitting unique signals and installed in a store in order to obtain behavior analysis results in the store by fine movement unit, resulting in increases in the number of man-hours and the cost of the equipment. The present invention solves the problem of an increase in the number of electronic devices that transmit unique signals and are installed in a store.

A behavior analysis device including a plurality of wireless transmitters disposed in a facility and each configured to transmit a unique signal periodically, a mobile electronic device carried by a person moving in the facility and configured to receive the unique signals from the plurality of infrared transmitters, and a data analysis device configured to collect and analyze data from the mobile electronic device, wherein the mobile electronic device includes a device configured to keep time and a mechanism configured to count and record numbers of times of receiving unique signals every time unit, and wherein the data analysis device is configured to determine state information inside the facility by comparing a prerecorded pattern of number of times of receiving and the counted numbers of times of receiving every time unit.

A behavior analysis device according to the present invention calculates the state of position from the number of times of receiving of the unique signals electronic devices and permits overlap between the communication ranges. As a result, the present invention allows the communication distances of the electronic devices transmitting the unique signals to be extended and the number of wireless transmitters necessary for the whole store to be decreased without degrading the resolution of position locating.

DETAILED DESCRIPTION OF EMBODIMENTS

Hereinafter, embodiments according to the present invention are described referring to drawings.

Figure 1:
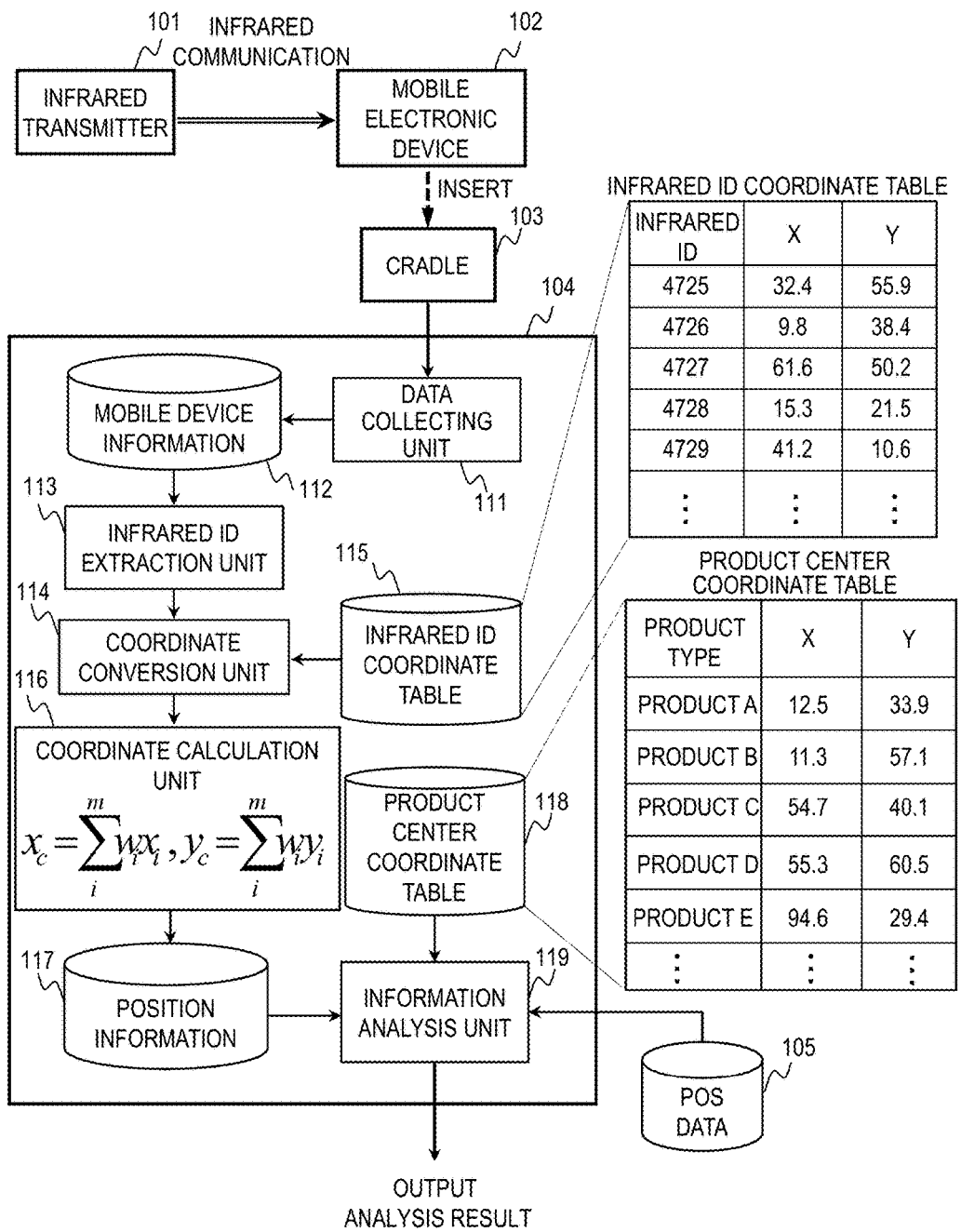
FIG. 1 is a configuration diagram illustrating an implementing method for a behavior analysis device according to the present invention.

FIG. 1 is a system configuration diagram according to an embodiment of the present invention to perform a behavior analysis of traffic lines in a store.

A reference numeral 101 designates each one of a plurality of infrared transmitters disposed in a store. A reference numeral 102 designates a mobile electronic device carried by a customer. A reference numeral 103 designates a cradle to which the mobile electronic device is inserted to collect data. A reference numeral 104 designates a data analysis device. The infrared transmitter 101 periodically, with a frequency of once a second for example, transmits the infrared ID, which is a unique signal, by infrared communication. The mobile electronic device 102 receives the infrared IDs transmitted from the infrared transmitters 101, and counts and records the numbers of times of receiving of the infrared IDs every specific time unit, for example, every 10 seconds. The recorded data is retained in the mobile electronic device 102 until the mobile electronic device 102 is inserted into the cradle 103 and the data is collected from the mobile electronic device 102.

Next, the configuration of the data analysis device 104 is described with reference to FIG. 1.

When the mobile electronic device 102 is inserted into the cradle 103, a data collecting unit 111 reads the data from the mobile electronic device 102 and saves the data to mobile device information 112. An infrared ID extraction unit 113 extracts the Infrared IDs, the corresponding numbers of times of receiving and the corresponding reception times from the mobile device information 112. A coordinate conversion unit 114 converts the infrared IDs into position coordinates using an infrared ID coordinate table 115. A coordinate calculation unit 116 calculates position information from the converted position coordinates and the numbers of times of receiving, and saves the position information to position information 117. The information analysis unit 119 analyzes the position information 117 for the state inside the store using a product center coordinate table 118 and POS (Point of Sale) data 105, and outputs the state inside the store. The analysis result may be printed on paper or presented on a display device.

As illustrated in FIG. 1, the infrared ID coordinate table 115 associates each infrared ID with the coordinates in the store where the corresponding infrared transmitter 101 is placed, and the coordinates are represented by values of the X axis and the Y axis. The product center coordinate table 118 associates each product type with coordinates in the store represented by values of the X axis and the Y axis.

Information indicating which products were purchased by customers carrying the mobile electronic devices 102 is extracted from the POS data 105.

Each implemented unit may be configured to be an electronic device or a program executed by a computer.

Figure 2:
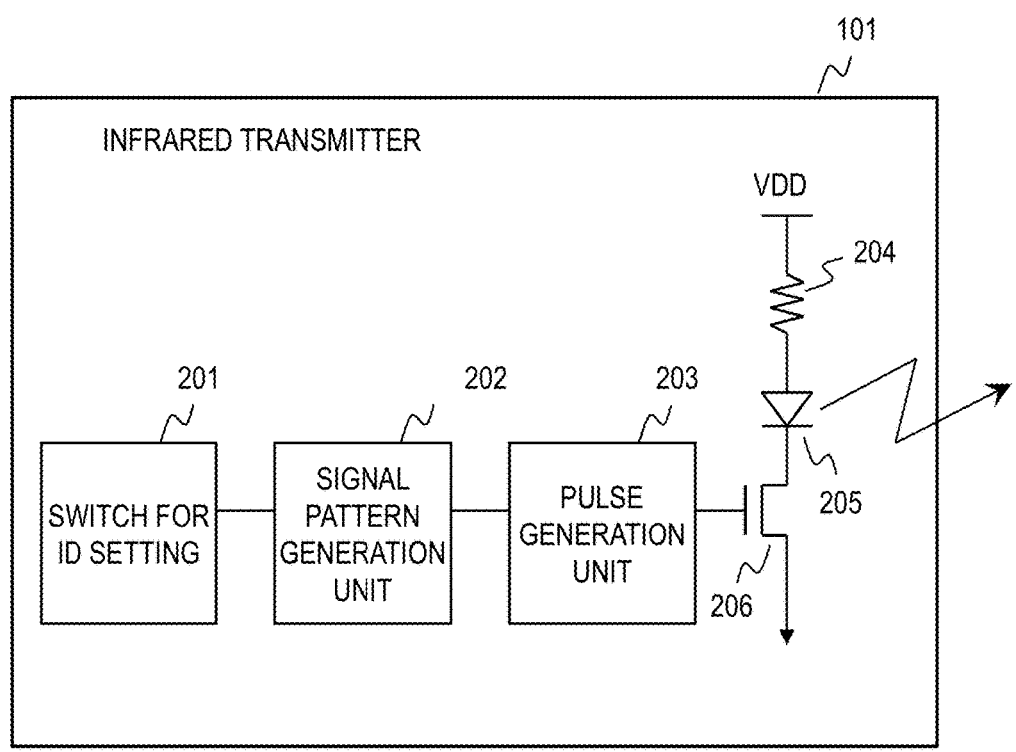
FIG. 2 is a configuration diagram illustrating an implementing method for an infrared transmitter.

FIG. 2 depicts an internal configuration of the infrared transmitter 101. A reference numeral 201 designates a switch that sets the ID of the unique signal. A reference numeral 202 designates a signal pattern generation unit that converts the set ID into a signal pattern. A reference numeral 203 designates a pulse generation unit that generates an infrared emission pulse. A reference numeral 204 designates a resister. A reference numeral 205 designates an infrared emitting diode. A reference numeral 206 designates a MOS transistor.

The implemented signal pattern generation unit 202 and the implemented pulse generation unit 203 each may be configured to be an electronic device or a program executed by a computer.

The transmission interval of the infrared ID is 1 second, for example, and the transmission period for one time of transmission is 1 millisecond, for example. The transmission interval of approximately 1 second is enough to trace movements of people. The transmission interval of 1 second and the transmission period of 1 millisecond allow preventing significant problems caused by interferences between the infrared transmitters 101 without a special mechanism. For example, if the times of transmission of the infrared transmitters 101 are random, the possibility of interference between two infrared transmitters is approximately $1/1000$, and it is no problem to ignore the value.

Figure 3:
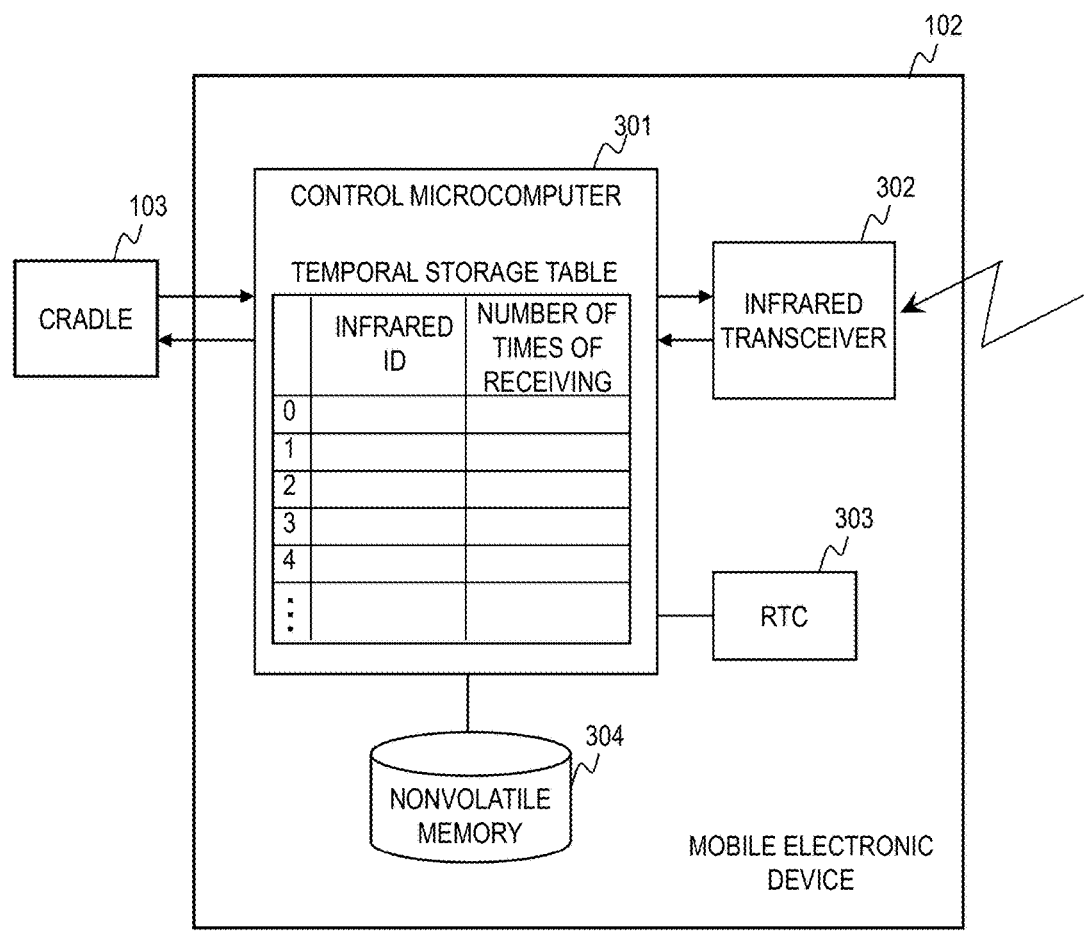
FIG. 3 is a configuration diagram illustrating an implementing method for a mobile electronic device.

FIG. 3 depicts an internal configuration of the mobile electronic device 102. A reference numeral 301 designates a control microcomputer that controls the mobile electronic device 102. A reference numeral 302 designates an infrared transceiver that performs infrared communications with the infrared transmitters 101. A reference numeral 303 designates an RTC (Real Time Clock) that keeps the current time. A reference numeral 304 designates a nonvolatile memory retaining measured data. Another type of memory which can retain data may be used. In this example, nonvolatile memory is used. A reference numeral 103 designates a cradle that collects data from the mobile electronic device 102 inserted therein. The control microcomputer 301 temporally retains the number of times of receiving every receiving time unit for each received infrared ID, and stores the retained numbers of times of receiving into the nonvolatile memory at constant time intervals. The constant time interval is 10 seconds, for example. The RTC 303 manages the time. The control microcomputer 301 includes a temporal storage table illustrated in FIG. 3, and records the received infrared IDs and the numbers of times of receiving into the table.

Figure 4:
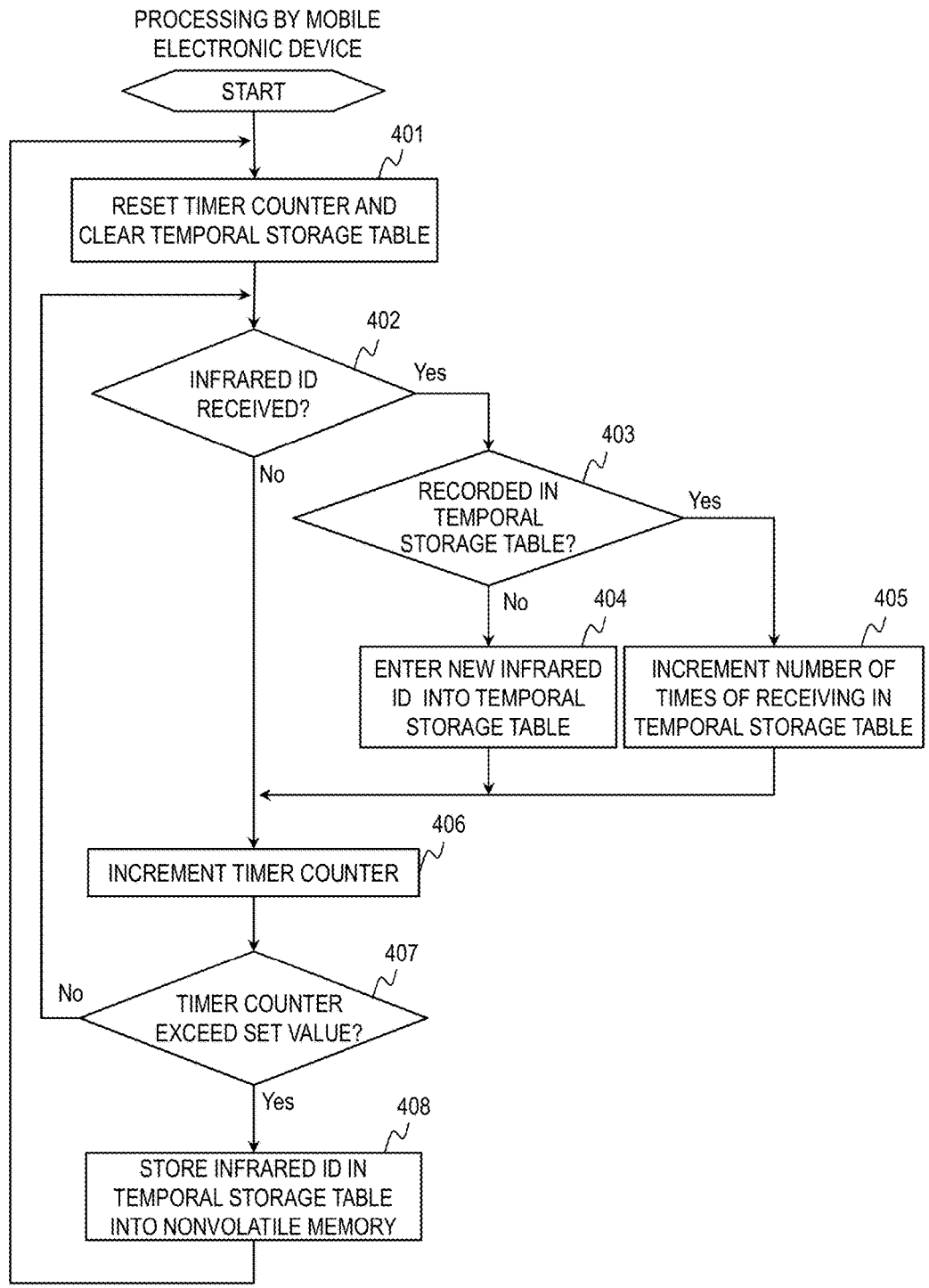
FIG. 4 is a flowchart illustrating an implementing method for a mobile electronic device.

FIG. 4 depicts a flowchart for explaining an operation of the mobile electronic device 102. In Step 401, the mobile electronic device 102 resets a timer counter, and clears a temporal storage table. The timer counter is set, for example, such that the series of steps in FIG. 4 establish a loop in 10 seconds. The temporal storage table is the temporal storage table 301 illustrated in FIG. 3, for example. In Step 402, the mobile electronic device 102 determines whether an infrared ID has been received. When an infrared ID has been received, the mobile electronic device 102 proceeds to Step 403. If an infrared ID has not been received, the mobile electronic device 102 proceeds to Step 406. In Step 403, the mobile electronic device 102 determines whether the received infrared ID is stored in the temporal storage table. If the received infrared ID is stored in the temporal storage table, the mobile electronic device 102 proceeds to Step 405. If the received infrared ID is not stored in the temporal storage table, the mobile electronic device 102 proceeds to Step 404. In Step 405, the mobile electronic device 102 increments the number of times of receiving in the table since the received infrared ID is stored in the temporal storage table. In Step 404, the mobile electronic device 102 enters the new ID and the number of times of receiving of 1 into the table since the received infrared ID is not stored in the temporal storage table.

In Step 406, the mobile electronic device 102 increments the timer counter, and the mobile electronic device 102 returns to Step 402 to repeat a loop until the timer counter exceeds the set vale in Step 407. As described above, this loop is repeated for 10 seconds and the mobile electronic device 102 proceeds to Step 408. In Step 408, the mobile electronic device 102 stores the information in the temporal storage table into the nonvolatile memory.

The mobile electronic device repeats the series of steps.

Figure 5:
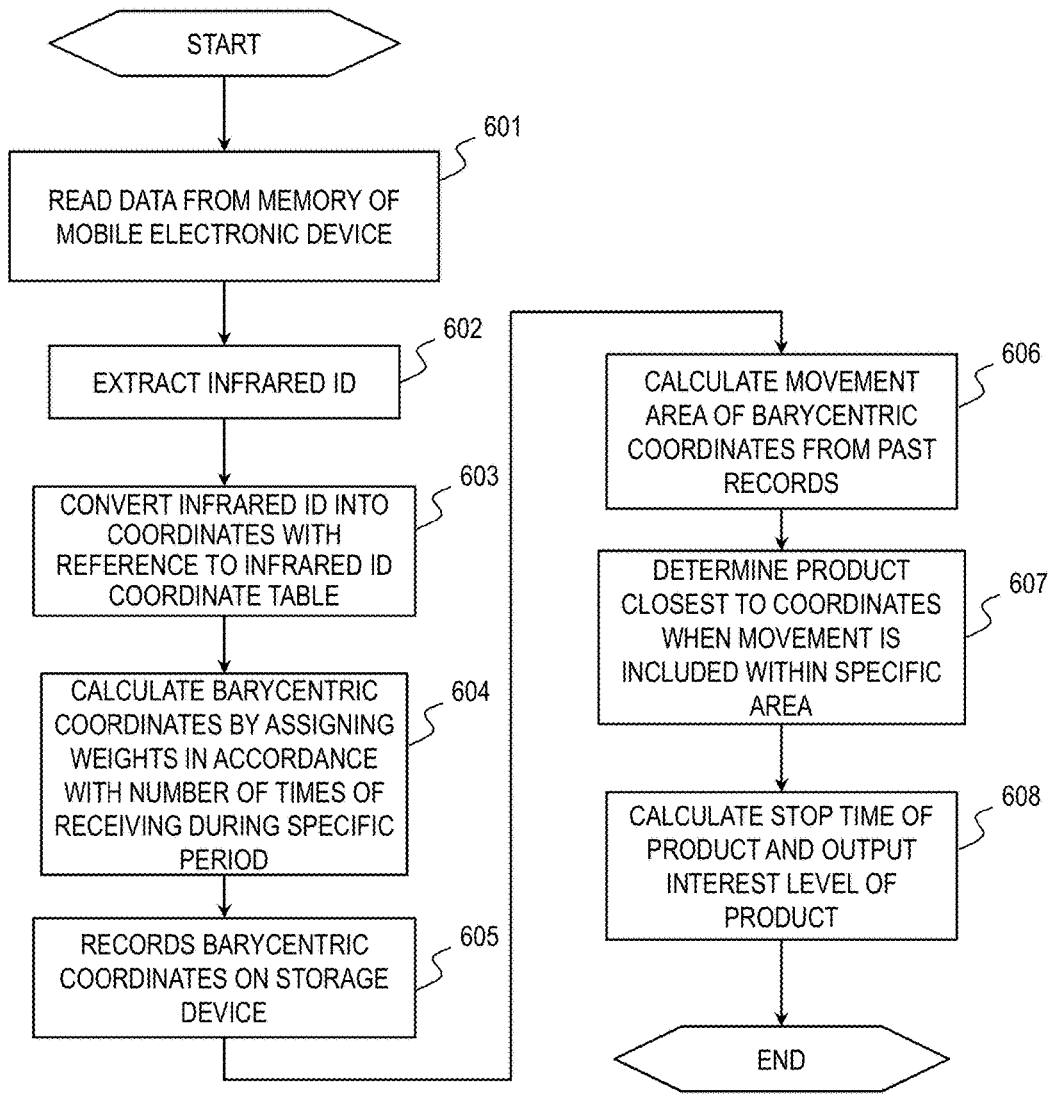
FIG. 5 is a flowchart illustrating an implementing method for a data analysis device.

FIG. 5 depicts a flowchart for explaining an operation of the data analysis device 104.

In Step 601, the data analysis device 104 reads data from the nonvolatile memory of the mobile electronic device. In Step 602, the data analysis device 104 extracts information on infrared IDs from the read data. In Step 603, the data analysis device 104 converts each of the infrared IDs into positon coordinates using the infrared ID coordinate table. In Step 604, the data analysis device 104 assigns a weight to the coordinates of each of the received IDs in accordance with the number of times of receiving during a specific period, 10 seconds for example, and calculates the barycentric coordinates. In Step 605, the data analysis device 104 records the calculated barycentric coordinates on the storage device. In Step 606, the data analysis device 104 calculates the movement area of the recorded barycentric coordinates. In Step 607, the data analysis device 104 determines the product that is the closest to the coordinates when the calculated movement is included within a specific area. In Step 608, the data analysis device 104 calculates the stop time and outputs the interest level. The result may be printed on paper or presented on a display device.

Figure 6:
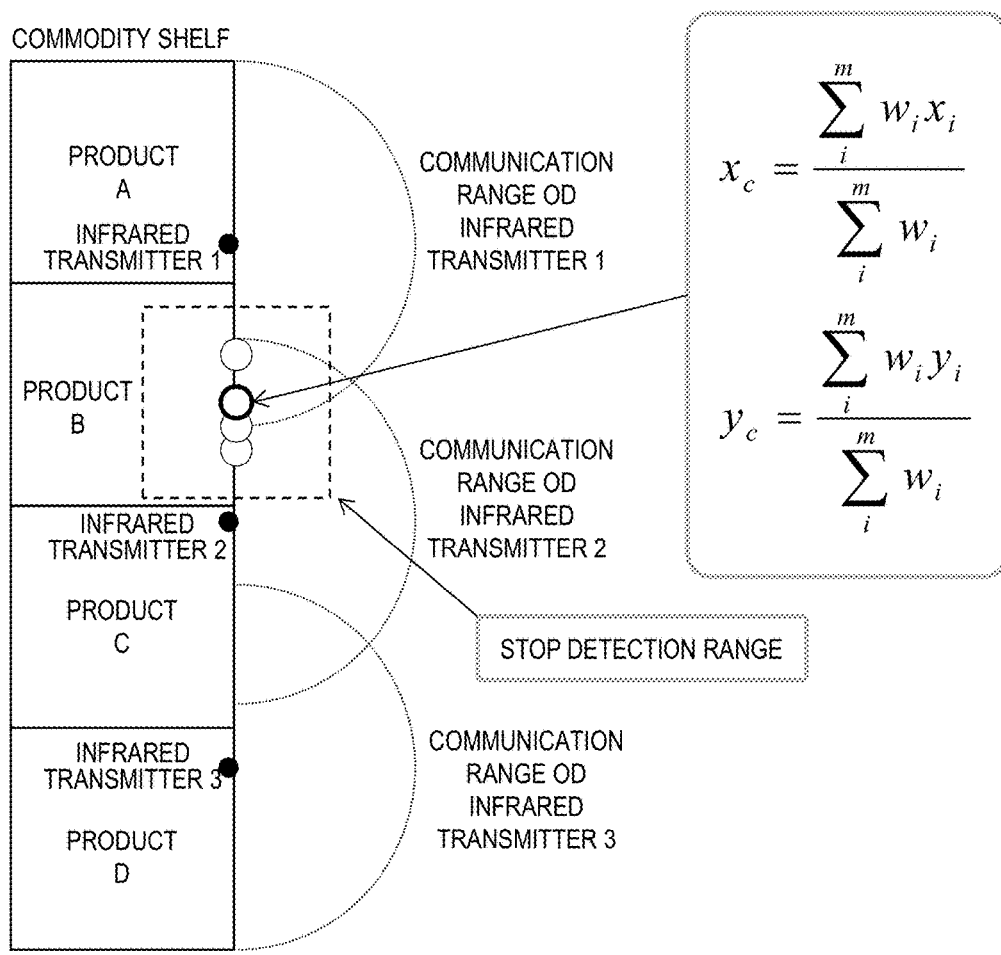
FIG. 6 is a diagram explaining an operation of the behavior analysis device according to the present invention.

FIG. 6 is a drawing for explaining the processing in a coordinate space by the data analysis device 104. A product A, a product B, a product C and a product D are displayed on a commodity shelf. An infrared transmitter 1 is placed in the range for the product A, an infrared transmitter 2 is placed in the range for the product C, and an infrared transmitter 3 is placed in the range for the product D. The communication range of each infrared transmitter is indicated by a semicircle.

It is desirable to place an infrared transmitter for each product and the communication ranges of the infrared transmitters do not overlap each other in order to facilitate the analysis. It facilitates determining the product from a received ID of an infrared transmitter. However, it is required to dispose infrared transmitters throughout the store, resulting in an enormous number of infrared transmitters and the high cost of installation and devices. Thus, it is preferable to minimize the number of infrared transmitters. For example, no infrared transmitter is placed for the product B in FIG. 6. The communication ranges of the infrared transmitters are wide, and one overlaps another. In this configuration, a plurality of IDs of infrared transmitters are received during a specific period, for example, during 10 seconds. Thus, the calculation is performed in accordance with a formula in FIG. 6 and the position coordinates are calculated. xc and yc are the coordinates to be determined, xi and yi are the coordinates of each infrared transmitter, m is the number of types of received infrared IDs, and wi is the number of times of receiving from each infrared transmitter. The infrared rays have strong directivity, and received is only the ID of an infrared transmitter placed in a direction that a person is facing. For example, when a person is standing in front of the product B, the ID of the infrared transmitter 1 or the ID of the infrared transmitter 2 is received in accordance with the behavior of the person. In this case, the difference between distances from infrared transmitters appears as the difference between angles, resulting in an increase of the possibility to receive the ID of the closer infrared transmitter. The calculation result in accordance with the formula in FIG. 6 is pulled toward the infrared transmitter with the larger number of times of receiving and gets closer to the precise position. This effect is great in the average of a large number of people, and contributes to improving the reliability of the analysis results. Thus, the precise traffic line information can be obtained with high cost efficiency. Further, the state information inside a facility can be obtained based on the strong directivity of the infrared rays.

Here, the determination on stopping is described. If a person stays within a predetermined stop detection range, such as a square with 1 meter sides, during a specific period, such as 20 seconds, it is determined that the person has stopped. It allows determining a product from the calculated stop coordinate position and analyzing products people are interested in. Thus, stops and products are associated and the relations between products and traffic lines can be analyzed efficiently.

The present invention is capable of reducing the number of infrared transmitters significantly by the above described processing. For example, when one infrared transmitter is place for two types of product, the number of infrared transmitters is reduced to half.

Figure 7:
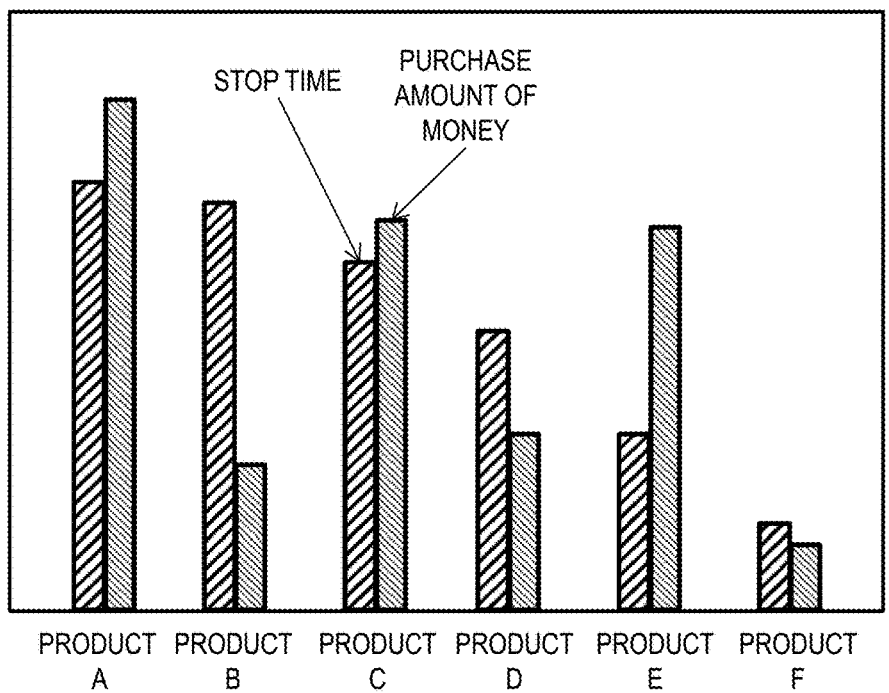
FIG. 7 is a drawing illustrating a display example of an analysis result.

FIG. 7 is a drawing illustrating a display example of an analysis result. FIG. 7 shows the stop time and the purchase amount of money of each of a product A, a product B, a product C, a product D, a product E and a product F. The purchase amount of money is obtained from the POS data. The analysis result indicates that the stop time of the product B is long; however, the purchase amount of money is small. In such a case, it may be possible to increase the purchase amount of money by improving the display or notices although it is necessary to consider the features of the product.

Figure 8:
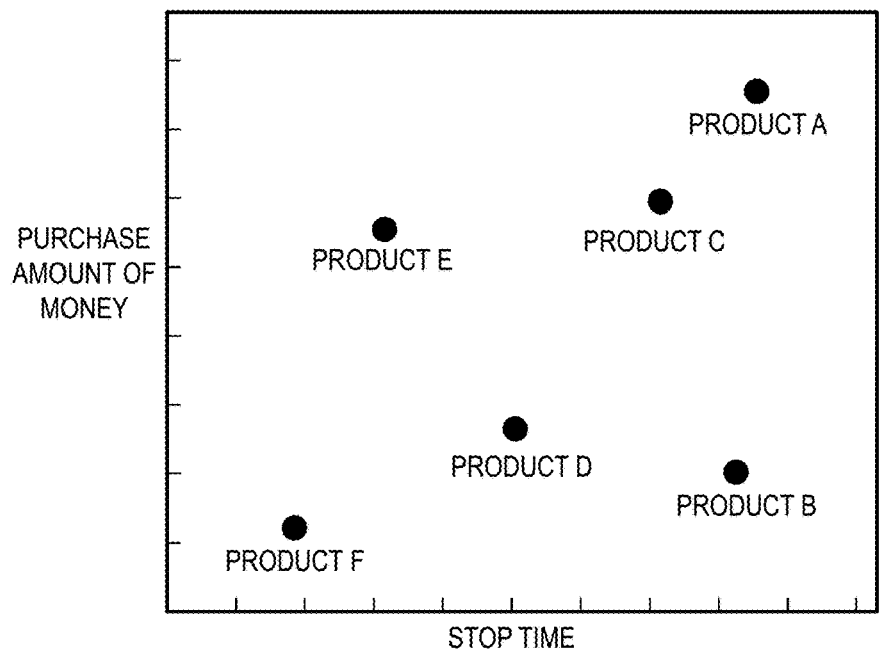
FIG. 8 is a drawing illustrating another display example of the analysis result.

FIG. 8 is a drawing illustrating another display example of the analysis result. The horizontal axis represents the stop time and the vertical axis represents the purchase amount of money, and the product A, the product B, the product C, the product D, the product E and the product F are plotted on the graph. The graph indicates the positive correlation between the stop time and the purchase amount of money on the whole. This display example allows the relation between the stop time and the purchase amount to be recognized clearly and the fact that the purchase amount of money of the product B is small to come into prominence. Thus, it is possible to associate and analyze the traffic lines, the product information and the sales.

Next, a method for disposing infrared transmitters and creating an infrared ID coordinate table is described.

Figure 9:
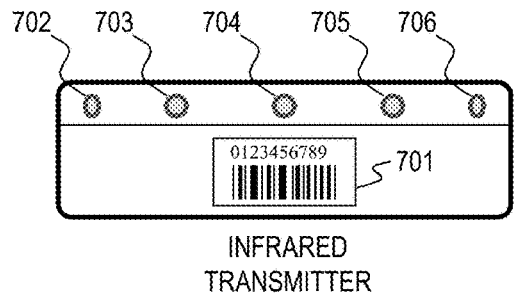
FIG. 9 is an outside drawing of an example of an infrared transmitter.

FIG. 9 is a schematic diagram of an infrared transmitter viewed from the side. A reference numeral 701 designates a barcode for identifying an infrared transmitter. Reference numerals 702 to 706 designate infrared light emitting diodes.

A unique barcode is affixed to each of all the infrared transmitters to identify each infrared transmitter.

Figure 10:
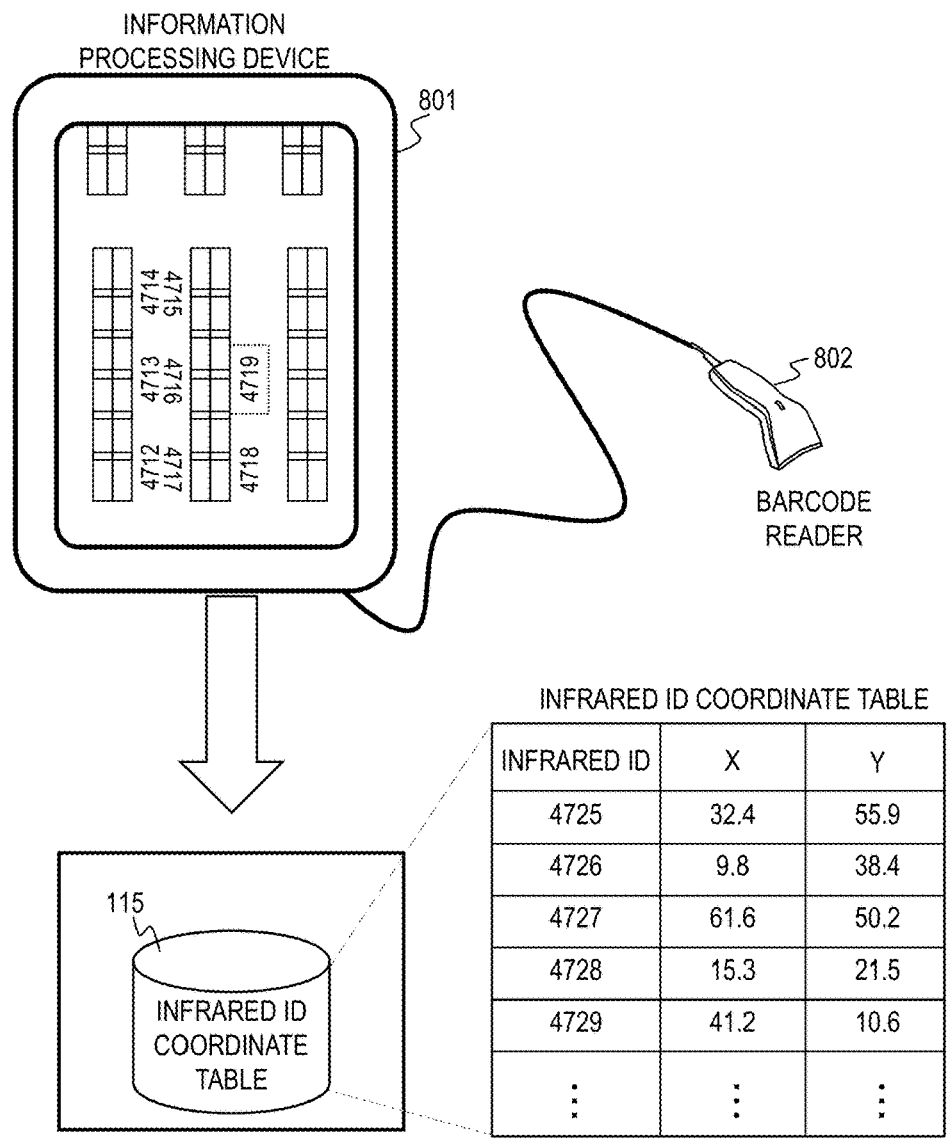
FIG. 10 is a configuration diagram of a device that creates an infrared ID coordinate table.

FIG. 10 is a schematic diagram of a device that creates the infrared ID coordinate table. A reference numeral 801 designates a tablet type information processing device and a reference numeral 802 designates a barcode reader to read a barcode affixed to an infrared transmitter.

The information processing device 801 displays a layout of things such as shelves in a store and sets positions of infrared transmitters the barcodes of which are read by the barcode reader 802. The information processing device 801 has a function to output the IDs and the coordinates of the set infrared transmitters.

A user carries the information processing device 801 and the barcode reader 802 in the store, reads the barcodes of the infrared transmitters and sets the positions of the infrared transmitters. Thus, the wireless devices and the placed positions are associated, and the precise traffic line information can be obtained with high cost efficiency.

In this way, the infrared ID coordinate table can be created. The devices illustrated in FIG. 10 allow the maintenance management after installing the infrared transmitters. For example, it is possible to check whether an infrared transmitter is missing.

The above example identifies an infrared transmitter by a barcode reader. Alternatively, the ID of an infrared transmitter may be received by infrared rays, and the infrared transmitter may be identified by the ID. In this configuration, an infrared receiver is used instead of the barcode reader 802. This configuration has an advantage of facilitating finding out a failure in a infrared transmitter in the maintenance and management.

Figure 11:
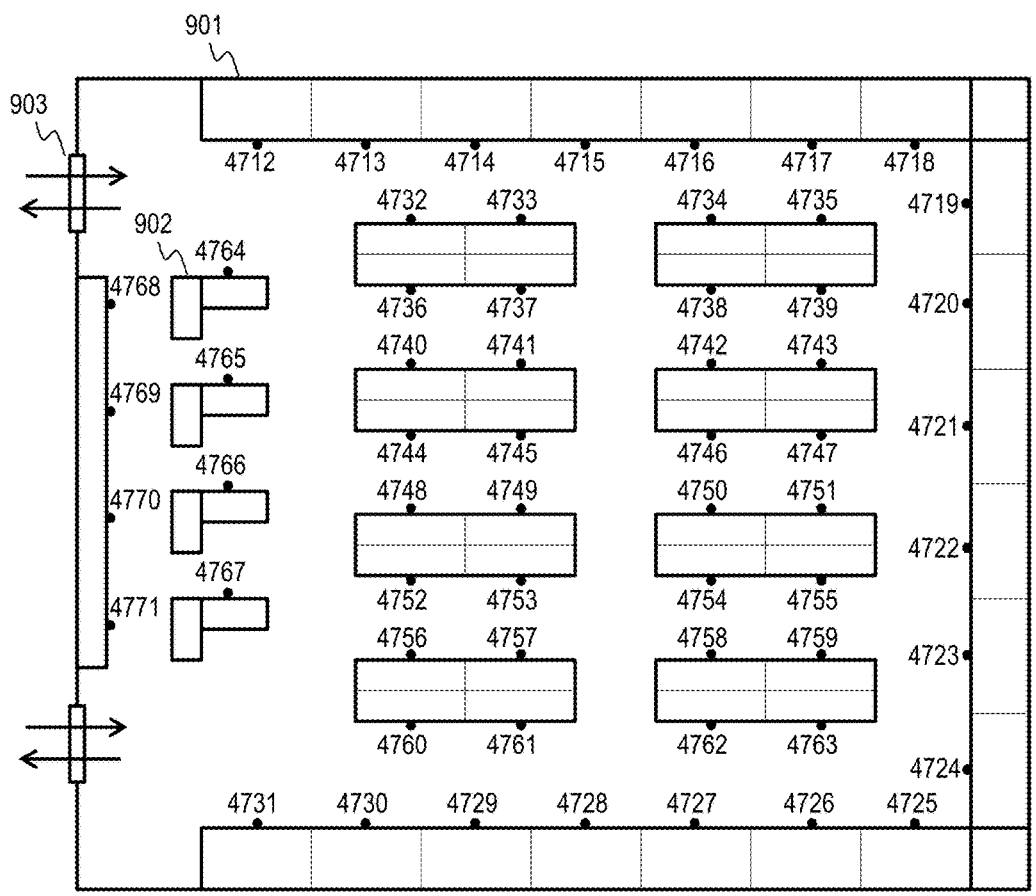
FIG. 11 is a drawing illustrating a layout example of infrared transmitters disposed in a store.

FIG. 11 is a drawing illustrating a state where infrared transmitters are disposed in a store. A reference numeral 901 designates commodity shelves, a reference numeral 902 designates a checkout and a reference numeral 903 designates an exit. Each four-digit value indicates the placed position and the ID of an infrared transmitter.

The layout of the infrared transmitters in the store illustrated in FIG. 11 allows measurement of behavior of people; however, the number of infrared transmitters is large as illustrated in FIG. 11. A double number of infrared transmitters would be required without the reduction effect by the present invention. The present invention produces the reduction effect in this way.

Figure 12:
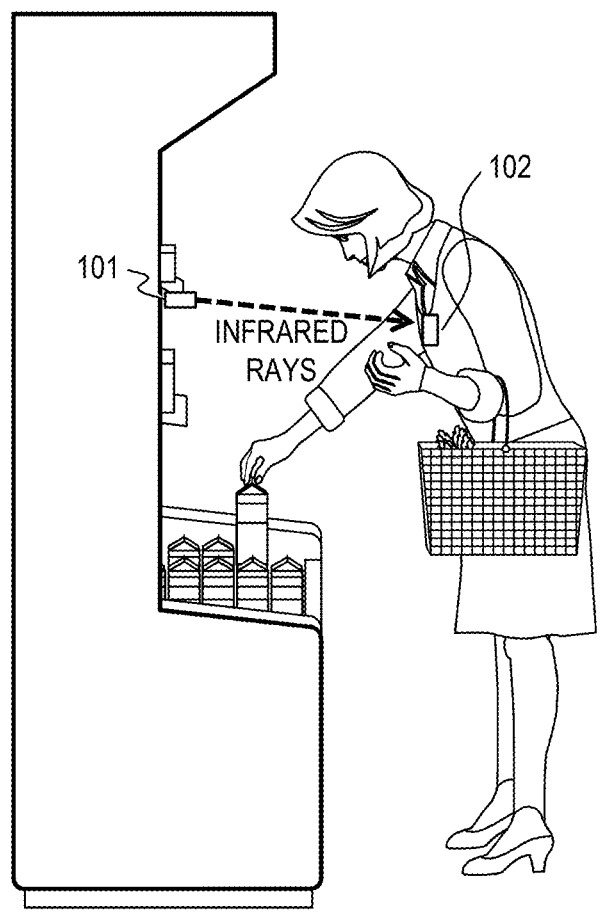
FIG. 12 is a drawing explaining measurement of customer behavior in a store.

FIG. 12 is a drawing illustrating a customer doing shopping in a store. The customer carries the mobile electronic device 102 hanging from the customer's neck while the customer is doing shopping. The infrared transmitter 101 is place on each shelf and the mobile electronic device 102 receives infrared rays from the infrared transmitter 101.

The mobile electronic device 102 is lent to the customer when the customer enters the store, hung from the customer's neck and returned back when the customer exits the store.

The mobile electronic device 102 hanging from the customer's neck can receive only the ID of the infrared transmitter faced by the customer, and it helps the customer to identify a product interesting to the customer. Using infrared rays for communications also contributes to the effect. The infrared rays have characteristics that they have strong directivity and do not pass through a wall and a person. Thus, the infrared rays facilitate identifying a product interesting to a customer.

Next, an example to analyze traffic lines in a store is described.

Figure 13:
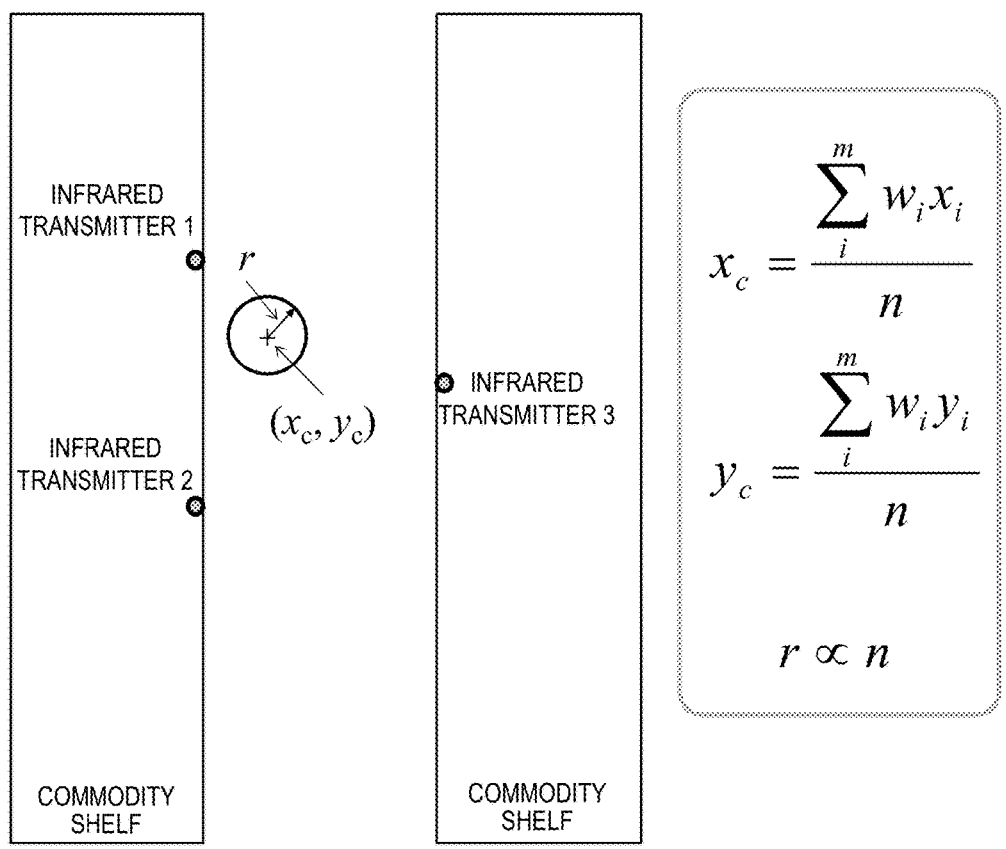
FIG. 13 is a drawing explaining a method for analyzing customer traffic lines.

FIG. 13 is a drawing illustrating an example to calculate the position of a customer from the coordinates of infrared transmitters and indicate the position by a circle with the radius r. xc and yc are the coordinates of the position to be obtained, xi and yi are the coordinates of each infrared transmitter, m is the number of types of received infrared IDs, wi is the number of times of receiving from each infrared transmitter, and n is the sum of the numbers of times of receiving.

The center coordinates of the displayed circle are calculated by a formula including coefficients of the numbers of times of receiving infrared rays. The radius is determined to be proportional to the sum of the numbers of times of receiving to visualize the interest level to the product.

Figure 14:
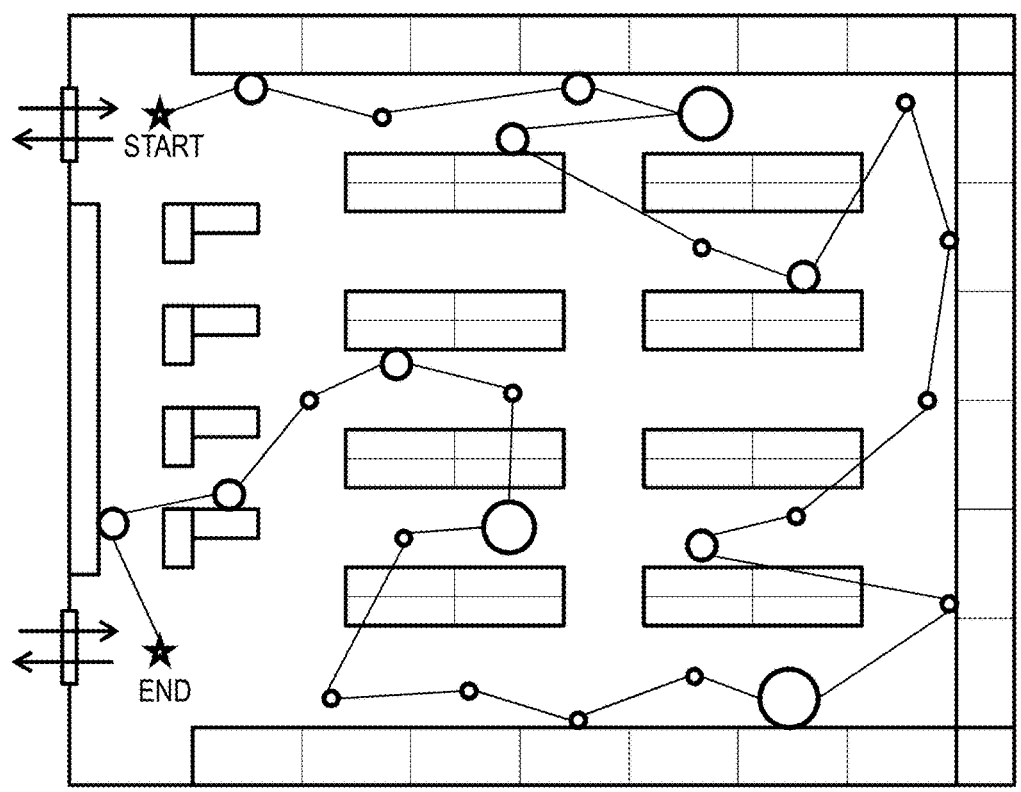
FIG. 14 is a drawing illustrating an example of an analysis result of customer traffic lines.

FIG. 14 is a drawing illustrating an example to measure and display traffic lines. The visualization allows a user to recognize movements between shelves and shelves with long staying time. Thus, the precise traffic line information can be obtained with high cost efficiency.

Analyzing the information described above allows a user to formulate an action plan for increasing the sales of the store and verify the effect of the action carried out.

REFERENCE SIGNS LIST

101 Infrared transmitter
102 Mobile electronic device
103 Cradle
104 Data analysis device
111 Data collecting unit
112 Mobile device information
113 Infrared ID extraction unit
114 Coordinate conversion unit
115 Infrared ID coordinate table
201 Switch
202 Signal pattern generation unit
203 Pulse generation unit
204 resister
205 Infrared emitting diode
301 control microcomputer
302 infrared transceiver
303 RTC
304 nonvolatile memory
801 Information processing device
802 Barcode reader

What is claimed is:

1. A behavior analysis device comprising:
a plurality of wireless transmitters disposed in a facility and each configured to transmit a unique signal periodically;
a mobile electronic device carried by a person moving in the facility and configured to receive the unique signals from the plurality of wireless transmitters, the mobile electronic device including a device configured to keep time and a mechanism configured to count and record numbers of times of receiving unique signals every time unit; and
a data analysis device configured to collect and analyze data from the mobile electronic device, the data analysis device including
(A) a data collecting unit to read data from the mobile electronic device and save the data read as mobile device information,
(B) an infrared ID extraction unit to extract from the mobile device information, infrared IDs, and numbers of times of reception and reception times for each of the infrared IDs,
(C) a coordinate conversion unit to convert the infrared IDs into position coordinates of the mobile electronic device within the facility,
(D) a coordinate calculation unit to calculate position information for products of interest from the position coordinates of the mobile electronic device, a number of types of received infrared IDs, and the numbers of times of reception of the infrared IDs from each wireless transmitter, and then save the position information for the products of interest, and
(E) an information analysis unit to receive point of sale data, coordinates of product types within the facility, and the position information for the products of interest calculated by the coordinate calculation unit, and output an analysis result correlating product types, stop times of the person at locations of the product types within the facility, and product type purchase amounts of money.

2. The behavior analysis device according to claim 1, wherein each of the wireless transmitters configured to transmit the unique signal periodically is an infrared communication transmitter.

3. The behavior analysis device according to claim 1, wherein the data analysis device is configured to convert the unique signals received into position coordinates, and calculate position coordinates in the facility at certain time units by a formula including coefficients of the counted numbers of times of infrared ID reception.

4. The behavior analysis device according to claim 3, wherein pattern codes identifying respective devices are affixed to each of the plurality of wireless transmitters, and wherein an infrared ID coordinate table associates the plurality of wireless transmitters and corresponding coordinates of the mobile electronic device using the pattern codes.

5. The behavior analysis device according to claim 1, wherein the facility is a store selling a plurality of products, and each the plurality of wireless transmitters is configured to transmit the unique signal periodically, and wherein the data analysis device is configured to convert the received unique signals into prerecorded position coordinates, periodically calculate position coordinates in the store by a formula including coefficients of the counted numbers of times of receiving, determine that a person has stopped when the position coordinates stay within a specific range a specific number of times, and identify a product closest to the calculated position coordinates.

6. The behavior analysis device according to claim 5, wherein the display shows the stop times and purchase amounts together.

7. The behavior analysis device according to claim 3, wherein the display illustrates customer movements between shelves and shelves with long customer stop times.

* * * * *